United States Patent [19]

Hammond et al.

[11] Patent Number: 5,073,183
[45] Date of Patent: Dec. 17, 1991

[54] HYDRAULICALLY OPERATED BLANKET BATCH CHARGER

[75] Inventors: John A. Hammond, Washington, Pa.; Angelo J. Trunzo, Painesville, Ohio

[73] Assignee: Frazier-Simplex, Inc., Washington, Pa.

[21] Appl. No.: 593,117

[22] Filed: Oct. 5, 1990

[51] Int. Cl.$^5$ .............................................. C03B 3/00
[52] U.S. Cl. ........................................ 65/335; 65/27; 65/29; 65/160; 414/166
[58] Field of Search ..................... 65/29, 335, 160, 27; 414/166

[56] References Cited

U.S. PATENT DOCUMENTS

| | | | |
|---|---|---|---|
| 3,780,889 | 12/1973 | Frazier | 414/166 |
| 3,897,232 | 7/1975 | Groves | 65/29 |
| 4,004,903 | 1/1977 | Daman et al. | 65/335 X |
| 4,197,109 | 4/1980 | Frazier et al. | 65/335 |
| 4,328,019 | 5/1982 | Dejaiffe et al. | 65/335 X |
| 4,430,112 | 2/1984 | Tanaka | 65/335 |
| 4,854,959 | 8/1989 | Waltert | 65/335 |

*Primary Examiner*—Robert L. Lindsay
*Attorney, Agent, or Firm*—Webb, Burden, Ziesenheim & Webb

[57] ABSTRACT

A blanket charger for feeding raw batch material into a glass making furnace, particularly an end fired, sidewall fed type furnace. The charger has a main support frame with a raw batch hopper chute thereon and a reciprocable charger plate positioned under the hopper chute for receiving raw batch material therefrom. The charger plate is reciprocally moved by a fluid driven cylinder and piston device motivated by a fluid, preferably a nonflammable, water-glycol solution or by air. The travel distance of the charger plate in the forward and rearward strokes is selectively controlled by a pair of adjustable striker rod assemblies positioned on the charger plate which alternately contact a pair of frame mounted limit switches. Stroke speed of the cylinder may be varied by selective adjustment of appropriate control devices. An adjustable batch gate assembly is also provided to control the height of the raw batch deposited on the charger plate and permit direct readout of the height measurement at the rear face of the charger.

15 Claims, 6 Drawing Sheets

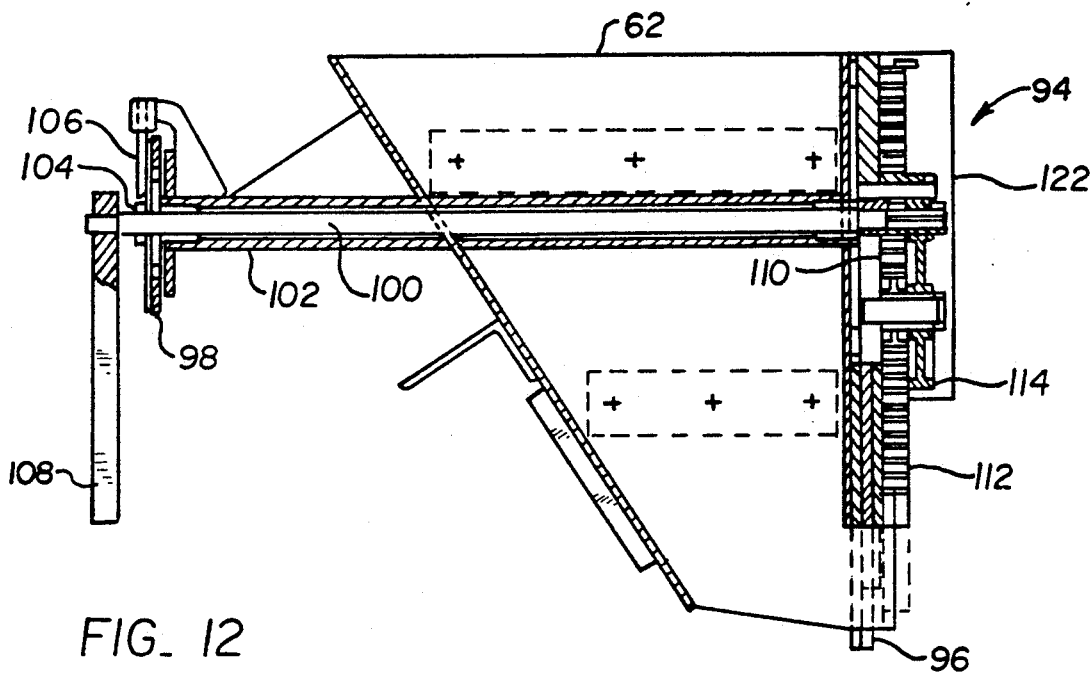
FIG_ 12
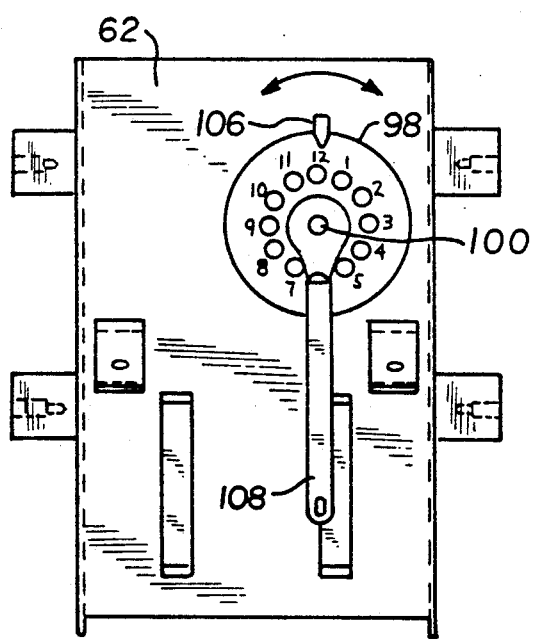
FIG_ 13
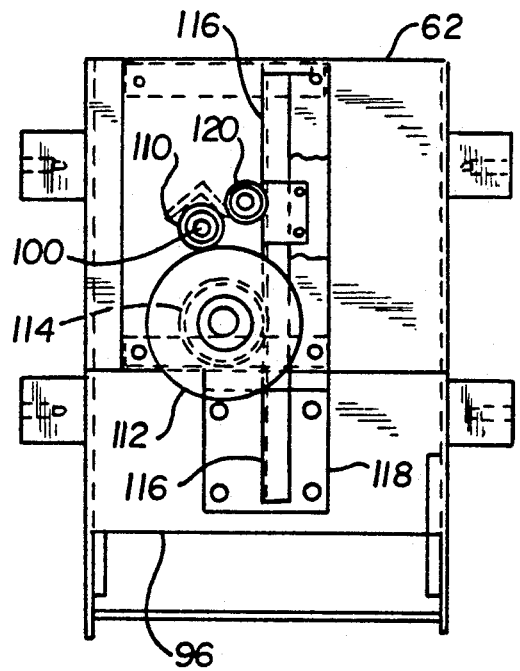
FIG_ 14

HYDRAULICALLY OPERATED BLANKET BATCH CHARGER

CROSS REFERENCE TO RELATED APPLICATIONS

This application contains subject matter generally disclosed in commonly assigned co-pending U.S. Pat. No. 4,983,206.

BACKGROUND OF THE INVENTION

The present invention relates generally to apparatus for charging raw batch material into a glass melting furnace and, more particularly, to so-called blanket batch chargers. U.S. Pat. No. 4,483,206, as well as U.S. Pat. Nos. 3,780,889 and 4,197,109 to Frazier et al., all commonly owned with the present invention, disclose so-called "large" blanket chargers. Such large blanket chargers are used in conjunction with glass furnaces of the type having firing burners mounted along the sides of the furnace wherein the batch charger is positioned adjacent an end of the furnace referred to as the "dog house" 3 A continuous furnace used for the manufacture of glass of this type comprises a large rectangular tank in which the molten bath of glass is contained. The raw batch material is continuously introduced into the rear of the furnace by the batch charging apparatus. Such large furnaces are capable of delivering from about 10 tons per day to about 10,000 tons per day of glass. The so-called dog house feeding area for these large furnaces extends across a substantial part of the full width of the furnace which can be on the order of from 20 to 30 feet. The so-called large blanket chargers may be employed in side-by-side configuration to extend along this full expanse. The charging bay or dog house of an end feed, side fired, large furnace structure typically includes a suspended wall set inwardly from a lower rear wall of the charging bay, leaving an open or semi-open trough therebetween defining the so-called dog house across a substantial part of the full width of the furnace. The dog house provides a downwardly extending, open area above the area of the molten glass into which the mixture of raw batch is charged. These large machines are mechanically driven as fully described in the above-referenced application and issued patents. The raw batch material initially floats on the molten glass and melts as it moves forward into the furnace proper. Such conventional batch chargers have a charger plate that downwardly extends into the dog house area and reciprocates in a direction along the long axis of the furnace. The charger plate is positioned beneath a hopper chute such that as the charger plate moves forward from a retracted limit of travel, raw batch material from the hopper chute is deposited in a layer on the charger plate. Simultaneously, the nose or forward edge of the charger plate pushes a previously deposited layer of the floating batch under the suspended wall at the end of the dog house into the melting zone of the furnace. As the charger plate moves rearwardly, the layer of batch material then residing on the charger plate is obstructed by a sand seal device at the rear of the hopper from being carried rearwardly and is moved off of the charger plate to fall over the nose thereof into the open area of the furnace from which the previous charge has just been cleared. This reciprocating cycle is continuously repeated to maintain a substantially constant level or blanket of charge and, hence, level of molten glass in the furnace as the melt is removed at the fore hearth region.

Due to the mechanically driven nature of the large blanket chargers, the length of the feeding stroke determined by the length of travel of the charger plate is not easily adjustable and requires some machine downtime in order to make changes thereto. In addition, the charger plates of these larger blanket batch chargers only travel in the sheltered area of the dog house wherein the upper surfaces of the charger plate are not exposed to direct flame impingement by the burners.

The present invention, on the other hand, relates to a blanket charger for use in a smaller, end fired furnace having its charging openings located at the sides thereof. For comparison purposes, these smaller, end fired furnaces generally have from about one ton per day upwards to about 500 tons per day of glass manufacturing capability. In such end fired furnaces, the flame from the burners generally traverses the area of the charging openings. This flame pattern makes it difficult to utilize a blanket type charger since the charger plate thereof must extend partially into the flame front and localized melting of the charger plate might result. Commonly used prior art reciprocating pusher type chargers employed in side fed, end fired furnaces are not wholly effective because they are not capable of metering or controlling the glass batch. These pusher type chargers can not feed a wet batch and, therefore, dusting is a problem common to these prior machines. In addition, the stroke speed and stroke length of prior chargers cannot be easily adjusted so as to make immediate charging changes in the furnace possible.

The present invention solves the problems heretofore encountered in end fired, side fed glass furnaces by providing a small blanket batch charger capable of charging a wet batch material to prevent dusting problems and having the capability of adjusting the stroke length and speed without shutting down the machine. The present invention provides a blanket charger which meters and controls the raw batch material to a degree unknown by the prior art reciprocating pusher type chargers commonly employed in side charged, end fired glass furnaces. The present invention provides a blanket charger which dispenses with the complicated mechanical linkages and shafts commonly employed in chargers of the prior art. The present invention further provides a blanket charger which is substantially self-contained and compact and has fewer moving parts than prior chargers, thus, requiring far less maintenance than conventional batch chargers.

SUMMARY OF THE INVENTION

Briefly stated, the present invention provides an improved batch charger for a side fed, end fired glass furnace. The batch charger includes a main support frame, preferably carrying a plurality of wheeled truck assemblies for travel on floor mounted rails in a direction into and away from the charging opening in the glass furnace. A charger plate is provided, having water-cooled top and side surfaces, which are adapted to withstand direct flame impingement from the end wall burners when the charger plate extends into the furnace a distance of about 6 inches, for example. The charger plate is mounted to the support frame for reciprocal travel on spaced-apart sets of wheeled rollers positioned therebeneath. The spaced, wheeled roller sets are mounted on a plate member which is, in turn, movably mounted to the main support frame to permit independent upward and downward jacking movement of the mounting plate relative to the main support frame to provide angular adjustability of the charger plate. In this manner, the angularity of the charger plate supported on the roller sets may be selectively adjusted by movement of the mounting plate relative to the main frame.

The present invention further includes a fluid actuated cylinder secured to the mounting plate of the charger plate. The cylinder is preferably hydraulically actuated, although a pneumatic air cylinder may also be employed. The cylinder reciprocally drives a piston connected to a shaft, which, in turn, is attached to an end of the charger plate. The charger plate carries a pair of adjustable striker rods which contact a pair of limit switches to control the stroke distance of the hydraulic cylinder in both the forward and rearward directions.

A self-contained hydraulic system comprising a fluid pump and reservoir is housed within the main frame thereof. A conduit for transmitting the hydraulic fluid extends between the hydraulic pump and reservoir unit and the cylinder. Electrical control conduits also extend between the limit switches and a hydraulic flow control unit including a two-way valve for reversing the flow of hydraulic fluid when the respective limit switches are struck. The hydraulic fluid employed in the system is preferably a water-glycol solution which is nonflammable and, thus, suitable for use in close proximity to a glass melting furnace where the ambient temperatures are high. By adjustment of the striker rods carried by the charger plate, the length of forward and rearward stroke is quickly and easily adjusted. Likewise, through either automatic or manual operation of the hydraulic flow control unit associated with the hydraulic pump, the speed of pump and the resultant speed of the reciprocating piston stroke may also be adjusted to provide any number of desired stroke speeds for the reciprocating charge plate in order to better control the glass level in the furnace.

The present invention also includes an adjustable batch gate mechanism which includes a rotatable adjustment shaft extending from a rear face of the charger to the front thereof. The rear of the adjustment shaft is coupled to a circular dial rotatably mounted on a rear wall of the charger. The face of the dial carries numeric indicia which are gear calibrated to provide direct reading of the height of the batch gate relative to the rotative movement of the adjustment shaft. In this manner, the batch feed height on the charger plate is accurately determined. The forward end of the adjustment shaft at the feed end of the charger carries a ring gear which is rotatably coupled to an outer gear set of a larger diameter gear which carries an inner pinion gear thereon. The pinion gear is coupled to a vertically extending rack gear which is attached to an outer face of the batch gate. The batch gate is slidably mounted in the front of the charger and vertically moves in response to the movement of the pinion driven rack gear so that the height of the raw batch delivered to the charger plate may be accurately controlled. These, as well as other features and advantages of the present invention, will become more apparent when reference is made to the following detailed description taken with the accompanying drawings.

BRIEF DESCRIPTION OF THE DRAWINGS

FIG. 12 is a cross-sectional side view of the hopper chute and batch gate adjustment mechanism;

FIG. 13 is rear elevation view of the hopper chute of FIG. 12 showing the circular dial and ratchet handle; and FIG. 14 is a front elevation view of the hopper chute showing the gear mechanism for vertically moving the batch gate.

DETAILED DESCRIPTION OF THE INVENTION

Figure 1:
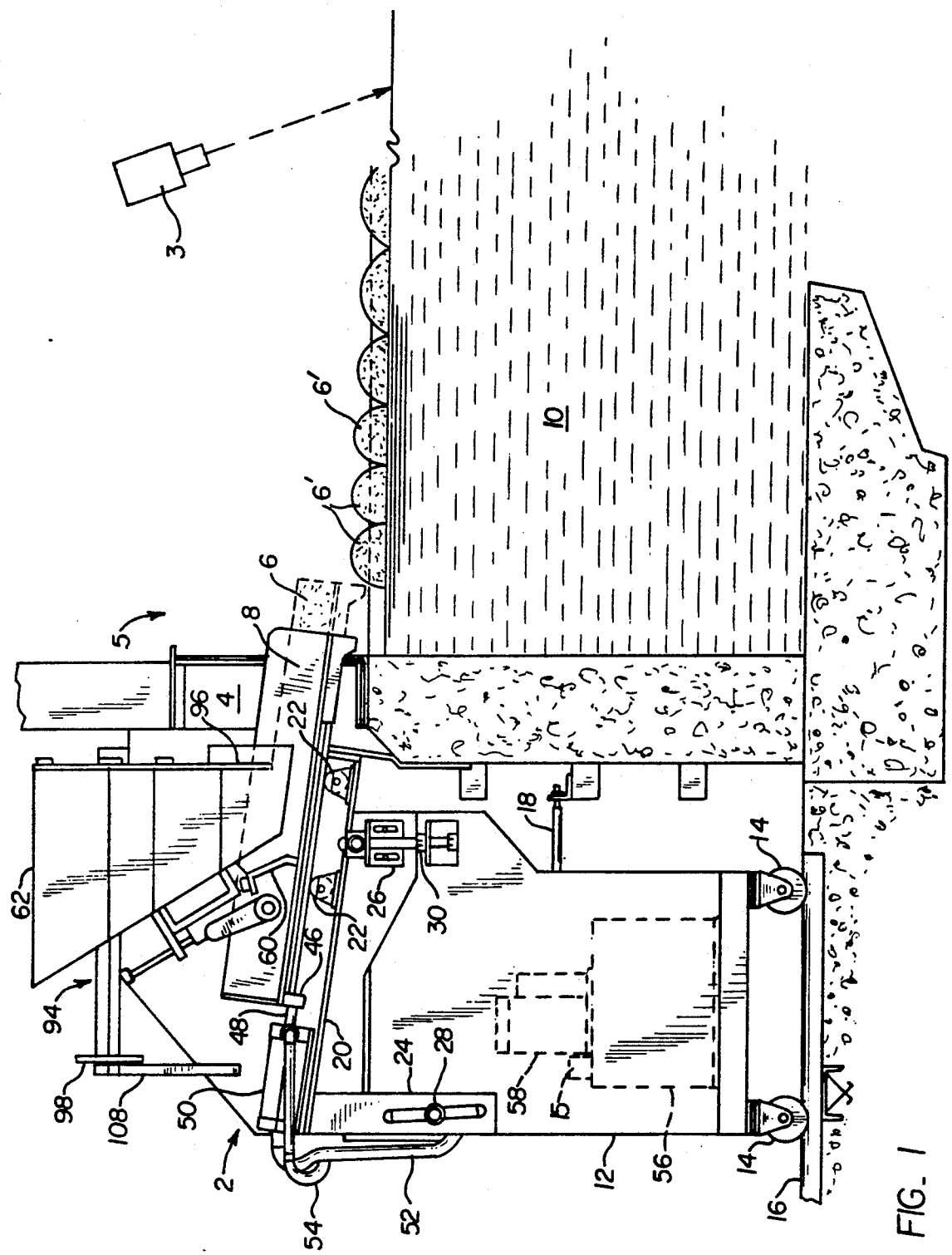
FIG. 1 is a side elevation view of a blanket charger according to the present invention shown positioned adjacent a glass furnace.
Figure 2:
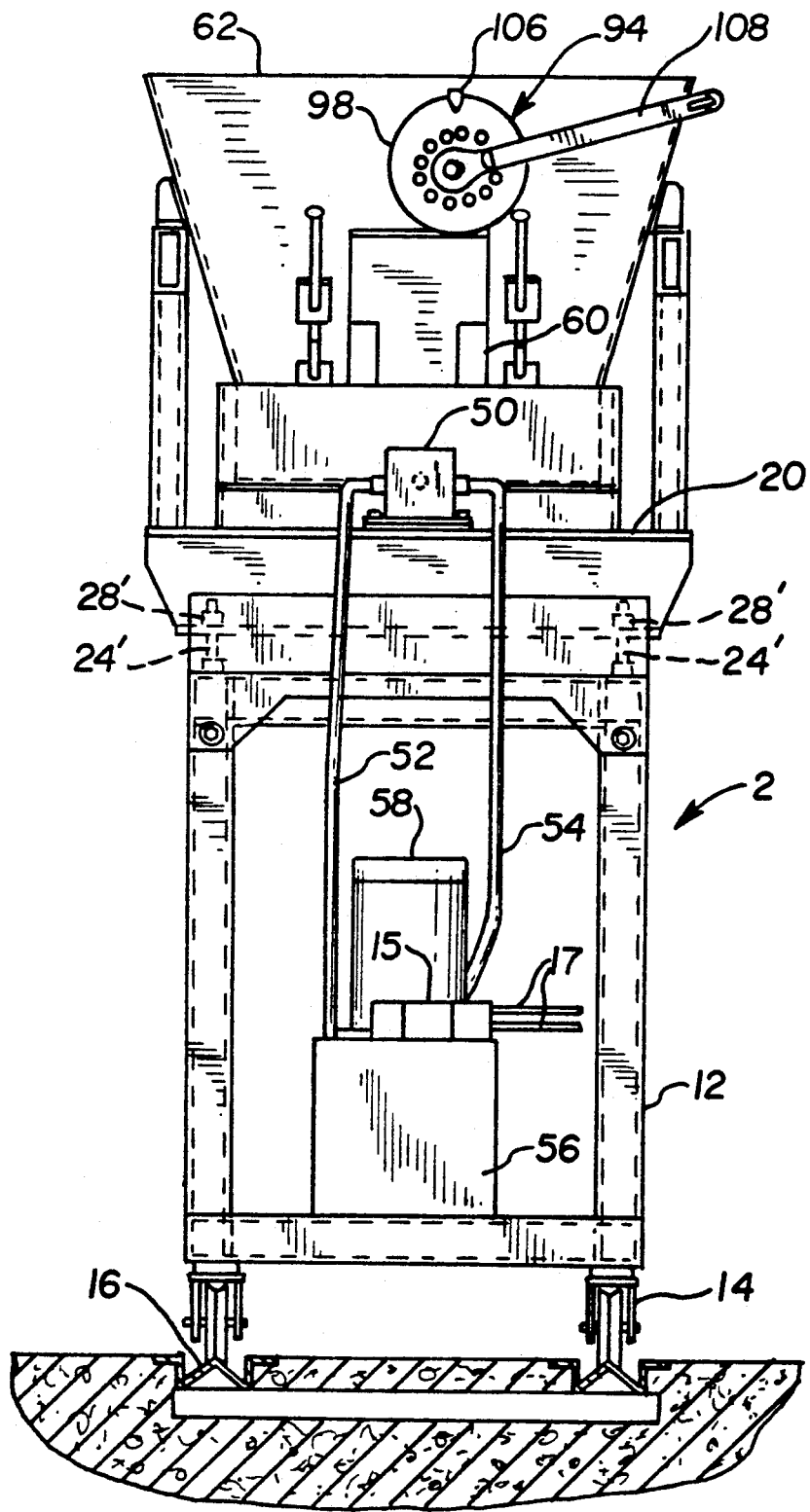
FIG. 2 is a rear elevation view of a blanket charger similar to FIG. 1.

With reference to the drawings, and particularly to FIG. 1, the batch charger of the present invention, generally designated 2, is shown adjacent a charging port of a glass furnace 5. A typical end fired glass furnace includes an opening or charging port 4 in the sidewall thereof for introducing raw batch material into the furnace. Wetted raw batch 6 is delivered from the reciprocating charger plate 8 in the form of "logs" 6' which float on the upper surface of the molten bath of glass 10. The raw batch in the form of logs 6' gradually melts as the logs are pushed further to the furnace interior by the reciprocating charger plate 8. This operation will become more apparent after the details of construction of the batch charger 2 of the invention are explained hereinafter. The batch charger 2 includes a supporting base or frame structure 12 mounted on wheeled truck assemblies 14 for travel on floor mounted rails 16 toward and away from the sidewall of the glass furnace 5 in a known manner. During operation the batch charger 2 may be secured to the sidewall of the glass furnace 5 by way of a tie-rod 18. The charger plate 8 of the present invention is supported by and reciprocally moves on a support plate 20. A pair of spaced-apart wheel sets 22 are attached to the support plate 20 and bear against the lower surface of the charger plate 8. The support plate 20 is vertically movable and tiltable relative to the frame structure 12 of the batch charger. The rear corner portions of the support plate 20 each carry a downwardly depending slotted jacking plate 24, while the forward corner portions each carry a slotted jacking plate 26 which permit vertical movement of the mounting plate 20 relative to the frame structure 12. The jacking plates 24 and 26 are held in place by bolts and nuts 28 and 30, respectively, whereby any desired tilt angle of the charger plate 8 may be obtained within the set limits of the slotted plates 24 and 26. An alternate jacking system for tilting the rear corners of the support plate 20 is shown in FIG. 2 which utilizes internally mounted jacking shafts 24' and adjustment nuts 28'.

Figure 4:
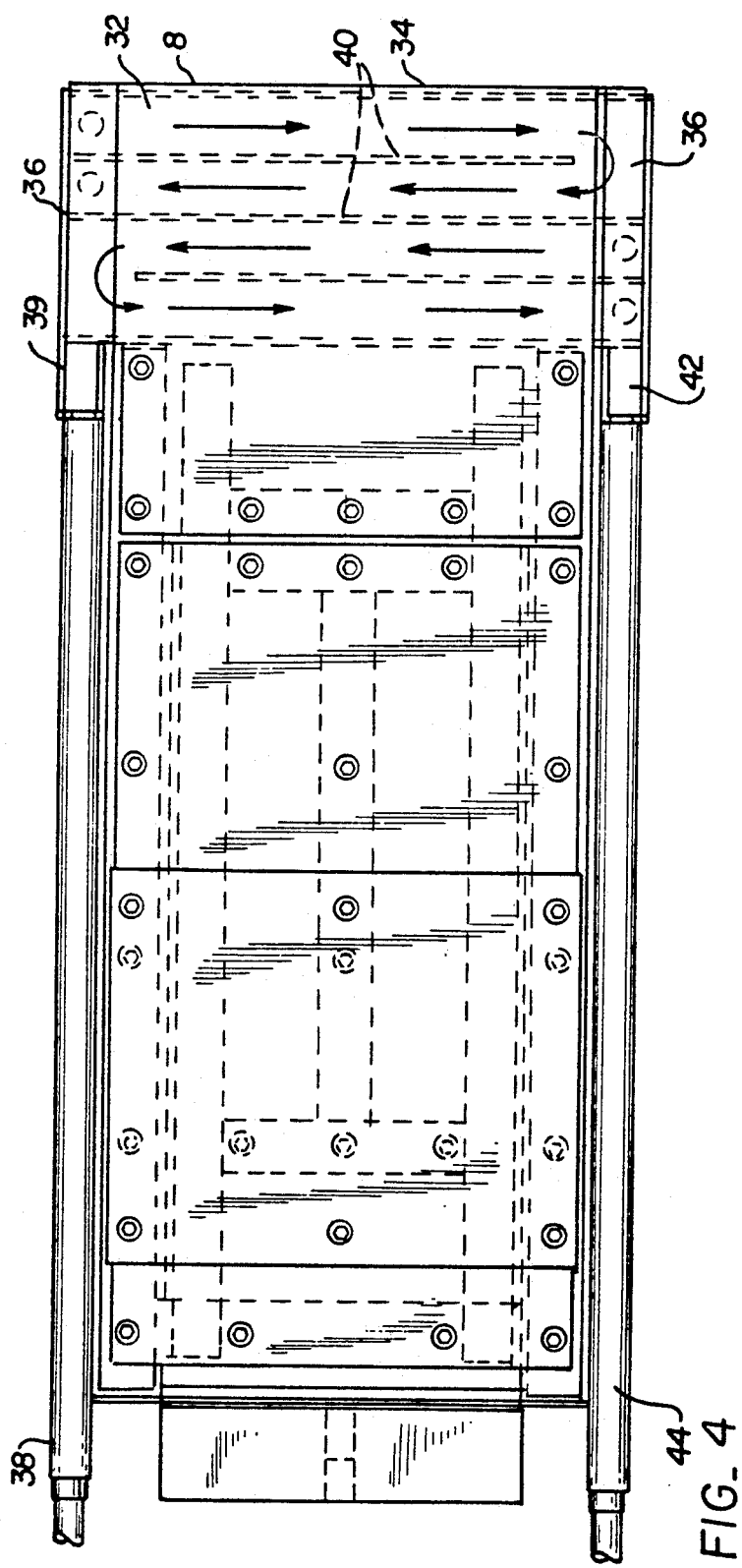
FIG. 4 is a top plan view of the charger plate of FIG. 3.
Figure 3:
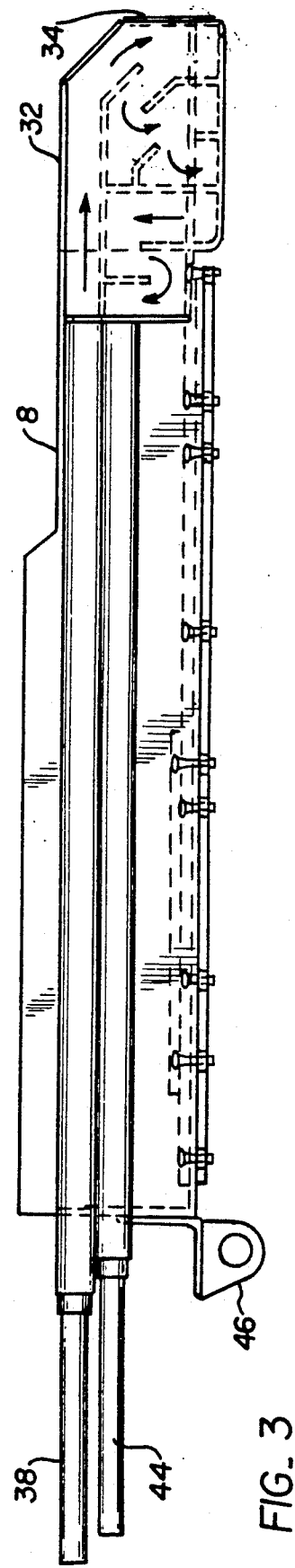
FIG. 3 is a side elevation view of a charger plate suitable for use in the blanket charger of the invention.

With reference to FIGS. 3 and 4, it will be appreciated that the present invention provides a charger plate 8 having water-cooled surfaces along a top surface 32, nose surface 34 and along opposed side surfaces 36. An inlet water conduit 38 delivers cooling water via orifices 39 to a series of cooling passages defined by baffle plates 40 fabricated in the forward section of the charger plate. The cooling water follows a circuitous pathway created by baffle plates 40 to insure cooling water flow along the upper surface 32, nose surface 34 and side surfaces 36 of the forward section of the charger plate. The spent cooling water exits the forward section of the charger plate at an outlet orifice 42 to enter a conduit 44 for disposal or recycling through a cooling tower. With a water-cooled front section, the charger plate 8 may be reciprocally moved directly into the interior of the end fired glass furnace 5. The top surface 32, nose surface 34 and side surfaces 36 are capable of withstanding direct flame impingement which typically occurs in furnaces of this type having rear wall mounted burner units. A conventional charger plate heretofore employed in the art contains no such water-cooled upper surface or side surfaces and would be incapable of service for any appreciable time period in such a furnace environment.

The novel charger plate 8 depicted in FIG. 3 is fitted with an apertured flange 46 which is attached to the forward end of a piston rod 48 reciprocally driven by a fluid actuated cylinder 50, FIG. 1. The cylinder 50 communicates with a source of fluid such as a hydraulic liquid by way of conduits 52 and 54 which are attached to a hydraulic unit comprising a reservoir 56 and pump 58 located within the frame structure 12 of the batch charger. The hydraulic system for actuating cylinder 50 preferably employs a nonflammable liquid such as a water-glycol solution. Due to the high temperatures and open flames encountered adjacent to the glass furnace 5, the use of a nonflammable liquid such as the water-glycol mixture presents no danger of a fire as would be experienced if a conventional hydrocarbon based hydraulic fluid is employed. The hydraulic system of the invention is completely self-contained within the charger 2 and need not be connected to any external source of fluid. It will be appreciated that in plant installation costs are minimized.

When the hydraulic cylinder 50 is actuated, the piston rod 48 extends to cause the charger plate 8 to travel outwardly on roller sets 22 into the hot confines of the glass furnace 5 with a measured layer of raw batch charge 6 thereon. The front section of the charger plate generally will extend into the furnace about 6 inches and the water cooling feature provides resistance to the burner flames which from time to time directly impinge upon the sides, nose and face surfaces of the charger plate when it is in the extended condition shown in phantom lines in FIG. 1. As the charger plate 8 reaches a predetermined stroke distance, a suitable first limit control is activated, as will be explained in greater detail hereinafter, which causes the hydraulic cylinder 50 to retract the piston rod 48 and charger plate to a rearward position shown in solid lines in FIG. 1. A lowered sand seal assembly 60 prevents rearward movement of the raw batch 6 from further rearward movement with the retracting charger plate which, in turn, causes the raw batch to drop away from the retracting charger plate 8 onto the surface of the molten glass. When a desired length of rearward stroke is reached, a second limit control signals the hydraulic control unit to cause the hydraulic cylinder to cycle into a forward stroke. During the forward stroke, the immediately deposited log 6' is pushed toward the furnace interior by the nose portion of the forwardly moving charger plate.

Figure 5:
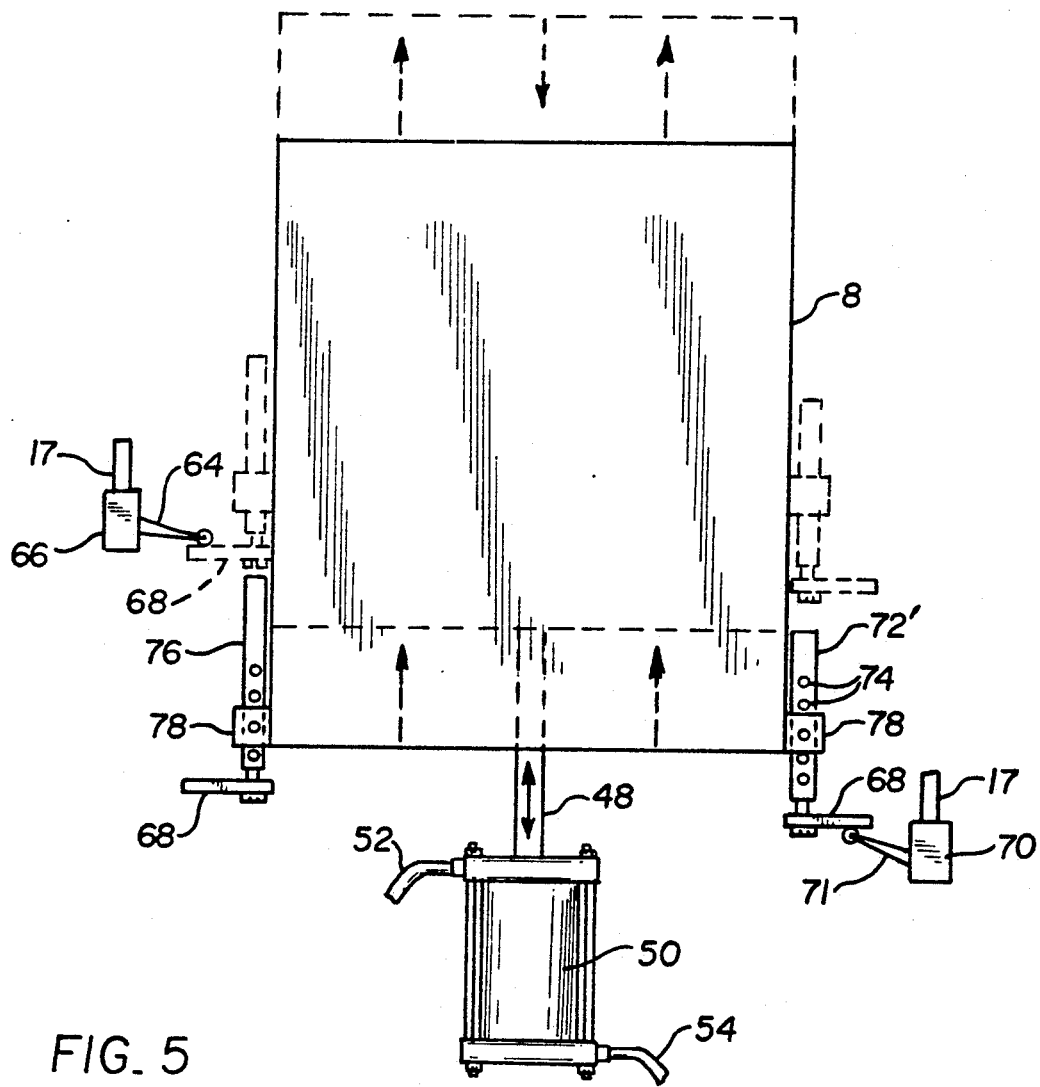
FIG. 5 is a schematic plan view of a portion of the charger plate showing the adjustable striker rods and limit switch controls thereon.
Figure 11:
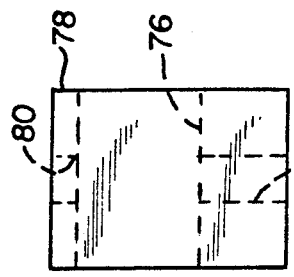
FIG. 11 is a side elevation view of the guide block of FIG. 10.
Figure 10:
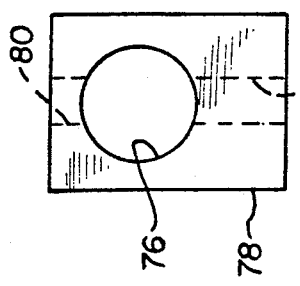
FIG. 10 is an end elevation view of a guide block for receiving the striker rods of FIGS. 7 and 8.
Figure 9:
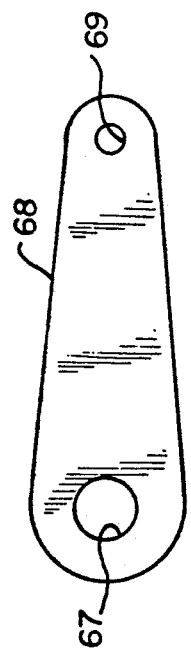
FIG. 9 is a plan view of a striker plate used on the adjustable striker rods of FIGS. 5 through 8.
Figure 8:
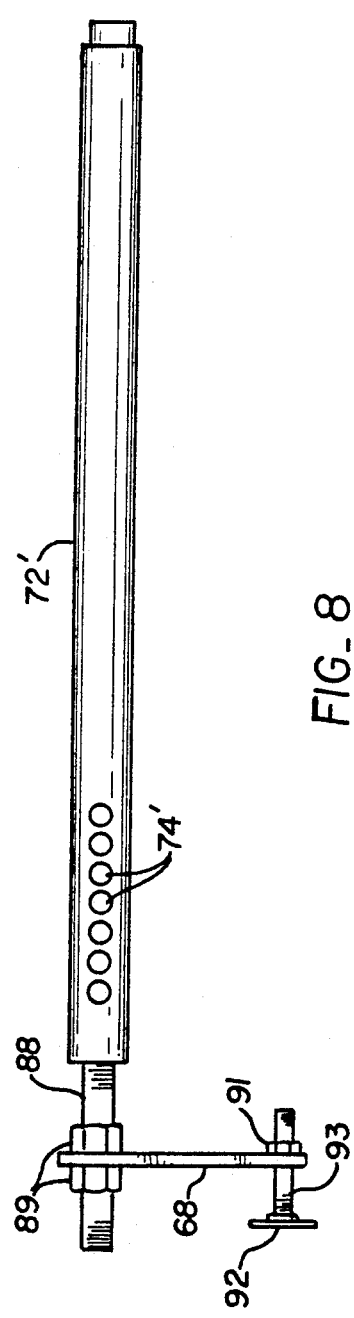
FIG. 8 is a further embodiment of a striker rod similar to FIG. 7.

The travel distances of the charger plate 8 both in its forward stroke and rearward stroke are determined by the striker rod and limit switch system depicted in FIG. 5. The travel of the charger plate 8 in the rearward stroke is halted when a striker plate 64 contacts a first limit switch 66. When activated, the limit switch sends a signal to a conventional hydraulic control unit 15 and a two-way valve associated therewith to cause a reversal of flow of hydraulic fluid to or from the cylinder 50 through the conduits 52 and 54. The piston rod 48 then moves outwardly causing the charger plate 8 to travel in its forward stroke until a second striker plate 68 engages a second limit switch 70. When activated, the second limit switch 70 sends a signal to the hydraulic control 15 to shift the two-way valve so as to again reverse the flow of hydraulic fluid to cylinder 50 causing piston rod 48 to retract along with the charger plate 8.

Figure 6:
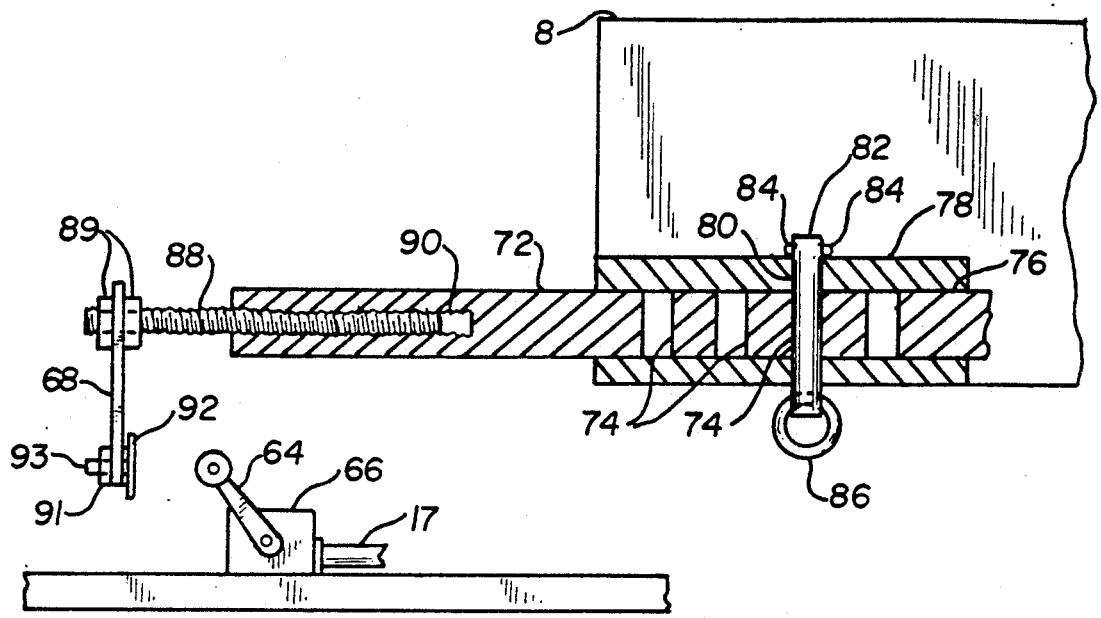
FIG. 6 is a partial side elevation view of one of the adjustable striker rods and limit switch controls of FIG. 5.
Figure 7:
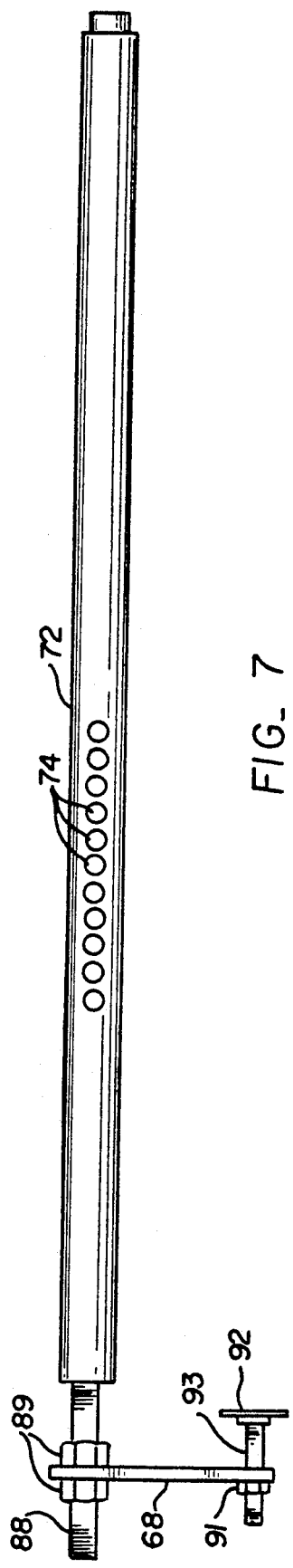
FIG. 7 is a top plan view of an adjustable striker rod for controlling the stroke of the charger plate.

The stroke length of the piston rod 48 and attached charger plate 8, when in the retracting mode, may be selectively adjusted by way of a striker rod 72 depicted in FIGS. 5-7. Striker rod 72 is formed from bar stock and has a plurality of spaced-apart, transverse bores 74 formed therethrough. The transverse bores 74 may be formed at regular spaced intervals of, for example, ½ inch. The striker rod 72 is slidably fitted within a bore 76 carried by an adjustment block 78. The adjustment block 78 is rigidly secured to a side of the charger plate 8 for travel therewith. The adjustment block has a smaller diameter, transverse bore 80 formed therein having an axis substantially perpendicular to a longitudinal axis of the bore 76. The striker rod 72 is slidably fitted within the bore 76 and locked into a desired orientation by way of a quick disconnect type pin 82 which is fitted within bore 80 in registry with a selected one of the transverse bores 74. The quick disconnect pin 82 is conventional and carries releasable means such as outwardly protruding spring-loaded ball bearing members 84 at the upper end thereof to form a stop at the upper surface of the adjustment block 78 when fully inserted in the bore 80. When the pin 82 is to be removed from the adjustment block 78 for adjustment of the striker rod 72, for example, the pull ring 86 attached to the lower end of the pin 82 is grasped and pulled downwardly. The spring-loaded ball bearings 84 then move inwardly under the influence of the exerted pulling force to permit the pin to be withdrawn from the bores 80 and 74. Finer adjustment of the stroke length is accomplished by way of a threaded rod 88 which is fitted within a threaded bore 90 coaxially formed within an end of the larger diameter striker rod 72. The threaded rod carries an adjustable striker plate 68 which has holes 67 and 69 formed therethrough. The threaded rod 88 passes through hole 67 to permit the striker plate 68 to be movably adjusted along the length of the exposed length of the threaded rod. A pair of locking nuts 89 are threadably positioned on the rod 88 on opposite sides of the striker plate 68 and are torqued sufficiently to hold the striker plate 68 in any desired location along the threaded rod 88. The lower portion of the striker plate 68 also is preferably fitted with an adjustable striker pad 92 which has a threaded shaft 93 passing through hole 69 in the lower end of the striker plate 68. Further fine tuning of the stroke length may also be accomplished by rotatably moving the striker pad 92 along threaded shaft 93 which causes the pad 92 to move relative to the plane of the striker plate 68. The striker pad is secured in position by way of a lock nut 91 rotatably positioned on the threaded shaft 93.

As seen in FIGS. 5 and 6, as the charger plate 8 is moved toward the furnace in a forward stroke, the piston rod 48 will continue to move the charger plate until the striker pad 92 (not shown in FIG. 5) engages the activation arm 64 of a first limit switch 66. Upon receiving a signal from the limit switch 66, the hydraulic control causes the conventional two-way valve to shift whereupon the hydraulically actuated cylinder 50 ceases its forward stroke and begins to retract the piston rod 48. Thereupon, the charger plate 8 retracts in a rearward stroke from the furnace as seen in FIG. 5 whereupon the striker plate 68 and pad 92 (not shown) engage the activation arm 71 of a second limit switch 70. Upon receiving a signal from the second limit switch 70, the hydraulic control unit again shifts the two-way valve to reverse the hydraulic fluid flow to the cylinder 50 to again cycle into the forward stroke.

Thus, it will be appreciated that the length of the forward stroke is easily adjusted by way of movement of the striker rod 72 within the block 78 in order to obtain a gross dimensional change along with movement of the striker plate 68 along the threaded rod 88 in order to obtain a finer dimensional control. A still finer adjustment is obtainable by movement of the striker pad 92 along the threaded shaft 93 secured on the striker plate 68. In a similar manner, adjustments may be made to the travel distance in the rearward stroke by way of the striker rod 72' and its attendant hardware. These stroke control adjustments may be quickly made by the machine operator so that prolonged periods of downtime are eliminated as are commonly required with prior art batch chargers.

The stroke speed of the hydraulic cylinder 50 may also be adjusted by controlling the speed of pump 58 which, in turn, controls the flow rate of hydraulic fluid through conduits 52 and 54. The motor speed of pump 58 may be controlled either manually with a potentiometer type of rheostat control or automatically with a known microcomputer control unit which is coupled to a glass level sensor 3 in the furnace 5. Thus, if the level of molten glass 10 in the furnace 5 descends to a low level, the speed of the hydraulic cylinder 50 may be instantly increased either manually or automatically to charge a greater amount of raw batch 6 into the furnace per unit time. In the event the level of molten glass becomes too high, the speed of the hydraulic cylinder 50 can be slowed to charge less raw batch per unit time. The schematic control unit 15 of known design is coupled in a circuit with the pump motor within the hydraulic system to cause the necessary flow rate increase or decrease of hydraulic fluid being delivered to the cylinder 50. The control unit 15 also includes the previously mentioned two-way valve for shifting the hydraulic fluid flow to and from the conduits 52 and 54 which supply hydraulic fluid to cylinder 50 for stroke cycling purposes. In addition, the control unit 15 includes conventional electrical conduits 17 placed in communication with the limit switches 66 and 70. Electrical signals generated when the activation arms 64 and 71 are engaged by the striker plate assembly 68 are sent to the control unit 15 to permit shifting of the hydraulic fluid flow through the cylinder 50.

The fluid actuation system of the present invention is particularly suitable for use with known automated glass level sensing mechanisms sometimes employed in glass furnaces. With reference to FIG. 1, a conventional laser glass level sensor 3 or the like is employed to determine the level of molten glass in the furnace 5. A conventional dipping probe level detector could also be employed. The laser detector 3 or like detector is electrically coupled to a conventional control unit 15 having a microcomputer which is adapted to receive input data therefrom. When the laser sensor 3 detects a decreasing level of molten glass, the control unit 15 receives such input data and causes an increase in pump motor speed as well as an increase in the stroke speed of the hydraulic cylinder 50. On the other hand, if the sensor 3 detects a high glass level, the appropriate data is fed to the control unit 15 which would then effect a slowdown of hydraulic fluid flow to the cylinder 50 to decrease the stroke speed of the piston rod 48 and the attached charger plate 8. In this manner, furnace control and resultant glass quality is closely monitored with greater precision than heretofore possible.

The amount of raw batch 6 from the hopper chute 62 is also closely controlled by a novel adjustable batch gate assembly, generally designated 94. The hopper chute 62 has a plurality of vertically extending, spaced-apart walls which define a compartment for holding the raw batch material 6 for deposit on the charger plate 8 as previously explained. A vertically movable batch gate 96 is positioned at the forward end of the hopper 62. The height of the bed of raw batch 6 from hopper 62 is determined by the spacing between the lower edge of the batch gate 96 and the upper surface of the charger plate 8. The batch gate 96 is raised and lowered a selected distance which is indicated on the rear of the charger 2 on a direct readout face of a circular dial member 98. The batch gate 96 is adjustable from a fully opened position to a nearly closed position which permits a wide variety of feed conditions with a very close control of the selected blanket thickness deposited on the molten glass surface. The batch gate 96 is conveniently lifted and lowered by a gear train arrangement which is turned by a rotatable adjustment shaft 100 which extends from the rear face of the hopper chute to the front face or charging side thereof, FIGS. 12-14. The adjustment shaft 100 is rotatably fitted within a cylindrical sleeve 102 which is coextensive therewith and stationary relative thereto. The shaft 100 is attached by ring coupling 104 to the circular dial 98 which is rotatably mounted to turn with the shaft 100. The face of the dial 98 carries numeric indicia which are calibrated to the gear train to visually indicate the actual height of the batch gate 96 as measured by its spacing from the charger plate 8. A stationary pointer 106 is also provided adjacent the dial 98 to permit direct reading of the numeric height indicia displayed on the face thereof.

The shaft 100 is rotated by a ratchet handle member 108 located at the rear face of the charger 2. The end of the rotatable adjustment shaft 100 at the front face or feeding end of the batch charger carries a ring gear 110.

The ring gear 110 is keyed to rotate with the adjustment shaft 100 and is also rotatably coupled to an outer ring gear 112 which carries a smaller diameter pinion gear 114 thereon. The pinion gear 114 is rotatably coupled to a vertically oriented and linearly extending rack gear 116. The rack gear 116 moves in an upward or downward direction responsive to the relative movement of the pinion gear 114, which, in turn, is motivated by rotation of the adjustment shaft 100 by way of coupled gears 110 and 112. The lower portion of the rack gear 116 is secured to a plate 118 which, in turn, is rigidly secured to the movable batch gate 96. Thus, it is understood that batch gate 96 vertically moves in an upward or downward direction responsive to clockwise or counterclockwise rotation of the adjustment shaft 100. An idler gear 120 is also positioned vertically above the pinion gear 114 in order to engage the gear teeth of the rack 116 and maintain the rack gear in a substantially vertical orientation. A plate-like closure member 122, FIG. 12, is affixed to the front face of the batch charger and covers the rotating gear train in order to shield the gear teeth from dirt and other foreign matter. A blower for supplying cooling air to the interior of the closure member 122 may also be provided if desired (not shown). A blower is also preferably provided to supply cooling air to the interior of the charger frame 12 in order to cool the hydraulic and electrical control components 56, 58 and 15, respectively.

While the presently preferred embodiment of the invention has been described hereinabove as being operated with a hydraulic fluid either in the form of conventional hydraulic oil or in the form of a water-glycol solution, it will also be appreciated that the cylinder 50 can be actuated by pressurized air in a totally pneumatic system. In such a pneumatic operation, an external air supply would naturally be required to supply high pressure air to the cylinder 50. Generally, however, in-plant air supplies are limited in capacity and also require expensive labor to install a piping system to reach the equipment. The herein described hydraulic system employs a totally self-contained fluid actuation unit which requires no hook-up to external hydraulic fluid sources. This naturally represents a great convenience and savings to the glass plant operation. This also provides a compact physical size which is advantageous around older glass furnace installations where space limitations are common.

While several specific embodiments of the invention have been described in detail herein, it will be appreciated by those skilled in the art that various modifications and alternatives to those details could be developed in light of the overall teachings of the disclosure. Accordingly, the particular arrangements are meant to be illustrative only and are not limiting as to the scope of the invention which is to be given the full breadth of the appended claims and any and all equivalents thereof.

What is claimed is:

1. A blanket charger for feeding raw batch to a glass making furnace, said blanket charger of the type having a main support frame with a raw batch hopper chute thereon and a reciprocable charger plate positioned under the hopper chute for receiving raw batch material therefrom, the improvement comprising:
   fluid driven actuation means for reciprocating said charger plate and for regulating a stroke length and travel speed of said charger plate;
   wherein the fluid actuation means includes first and second limit switch means mounted on the support frame adjacent said reciprocable charger plate and further includes firs and second adjustable striker rod means mounted on said charger plate, each of said striker rod means adapted to engage a respective limit switch at a forward stroke and at a rearward stroke of said charger plate and wherein a desired travel distance of said forward and rearward strokes may be obtained by selective adjustment of said striker rod means; and wherein each of the first and second striker rod means comprises a block member secured to the charger plate, said block member having a horizontal bore and a vertical bore formed therein for slidably receiving a rod member in said horizontal bore, said rod member having a plurality of spaced-apart, transverse bores formed therethrough for incremental registry with the vertical bore of said block member, a removable locking pin for placement through said vertical bore of said block member and a selected transverse bore of said rod member to prevent relative movement therebetween, said rod member also having a threaded coaxial bore formed at one end thereof to receive a threaded adjustment rod therein, a striker plate assembly adapted to engage one of said limit switched positioned on said threaded adjustment rod and selectively movable therealong.

2. The blanket charger of claim 1 wherein the fluid driven actuation means is motivated by air.

3. The blanket charger of claim 1 wherein the fluid driven actuation means is motivated by a water-glycol solution.

4. The blanket charger of claim 1 wherein the glass making furnace is an end fired, side feed type and wherein the charger plate has passages formed therein in contact with upper and side surface portions of a forward end thereof, whereby in use, a cooling water is supplied to said passages.

5. The blanket charger of claim 1 further comprising:
   batch gate adjustment means associated with the hopper chute including rotatable shaft means having a first end positioned at a rear face of the batch charger operably coupled by gear means at a second end to a vertically movable batch gate positioned at a front face of the batch charger for selectively raising and lowering said batch gate by rotative movement of the first end of the shaft means whereby the raw batch deposited on the charger plate from the hopper chute is selectively regulated.

6. The blanket charger of claim 5 including a dial means rotatably mounted on the rear face of the batch charger, said dial means coupled to rotate in relation to said shaft means and carrying calibrated indicia thereon, whereby, said dial indicia indicates a height of said batch gate relative to rotative movement of said shaft means.

7. The blanket charger of claim 5 including a pinion gear rotatably mounted on the front face of said batch charger coupled to a ring gear carried at the second end of the rotatable shaft and a rack gear coupled to said pinion gear and attached to said movable batch gate, whereby said batch gate vertically moves in response to rotative movement of said rotatable shaft.

8. The blanket charger of claim 7 including closure means surrounding said rack, pinion and ring gears.

9. A blanket charger for feeding raw batch material to a glass making furnace, said blanket charger of the type having a main support frame with a raw batch hopper chute therein, and a reciprocable charger plate positioned under the hopper chute for receiving raw batch material therefrom, the improvement comprising:
fluid driven actuation means for reciprocating said charger plate to feed batch material into the furnace and for regulating a stroke length and travel speed of said charger plate.

10. The blanket charger of claim 9 wherein the fluid driven actuation means is motivated by air.

11. The blanket charger of claim 9 wherein the fluid driven actuation means is motivated by a water-glycol solution.

12. A blanket charger for feeding raw batch material to a glass making furnace, said blanket charger of the type having a main support frame with a raw batch hopper chute therein, and a reciprocable charger plate positioned under the hopper chute for receiving raw batch material therefrom, the improvement comprising:
a) jacking means positioned beneath the charger plate for independently raising and lowering front and rear ends of the charger plate;
b) adjustable batch gate means associated with the hopper chute including rotatable shaft means having a first end positioned at a rear face of the batch charger and operably coupled by gear means at a second end to a vertically movable batch gate positioned at a front face of the batch charger for selectively raising and lowering said batch gate by rotative movement of the first end of the shaft means;
c) fluid driven actuation means for reciprocating said charger plate and for regulating a stroke length and travel speed of said reciprocal charger plate; and
d) control means associated with said fluid driven actuation means adapted to receive an input signal from a furnace mounted glass level detection means whereby said control means directs said fluid driven actuation means to increase the travel speed of said charger plate when the glass level is monitored in a low condition and to slow said travel speed when the glass level is monitored in a high condition.

13. The blanket charger of claim 12 wherein the fluid driven actuation means is motivated by a fluid comprising one selected from the group consisting of a water-glycol solution, air and hydraulic oil.

14. The blanket charger of claim 12 wherein the fluid driven actuation means is motivated by a water-glycol solution.

15. The blanket charger of claim 12 wherein the fluid driven actuation means is motivated by air.

* * * * *